United States Patent [19]

Huey-Miin

[11] 4,351,459
[45] Sep. 28, 1982

[54] AUTOMATIC GLASS TUBE CUTTER

[76] Inventor: Perng Huey-Miin, No. 35, 1st St., Fu Kuei New Village Tou-Chung Li, Chu-Tung Town, Hsin-chun Hsien, Taiwan

[21] Appl. No.: 210,737

[22] Filed: Nov. 26, 1980

[51] Int. Cl.³ .............................................. C03B 33/06
[52] U.S. Cl. .................................... 225/96.5; 83/407; 83/422; 83/425.1; 225/2; 225/3; 225/97; 225/99
[58] Field of Search .................. 225/96.5, 97, 99, 98, 225/2, 3; 83/407, 425.1, 404.4, 54, 422; 414/24

[56] References Cited

U.S. PATENT DOCUMENTS

| | | | |
|---|---|---|---|
| 2,726,719 | 12/1955 | Marcalus | 83/404.4 |
| 2,979,979 | 4/1961 | Hearden et al. | 83/407 |
| 3,717,292 | 2/1973 | Honeycutt et al. | 225/99 |
| 4,195,758 | 4/1980 | Morgan | 225/98 |

Primary Examiner—Frank T. Yost
Attorney, Agent, or Firm—Blair, Brown & Kreten

[57] ABSTRACT

Disclosed herein is a cutter for long glass tubes which are placed on a feeding table, and dropped into a carrier one by one, and then onto a specially wound conveyor for wave-like-transversal feed. When the glass tubes pass the cutter, they are cut one by one to the required length and the cut glass tubes are then packed or conveyed to another place for further processing.

4 Claims, 15 Drawing Figures

AUTOMATIC GLASS TUBE CUTTER

BACKGROUND OF THE INVENTION

This invention relates to an automatic cutter for glass tubes used in making Christmas bulbs.

Traditionally, glass tubes used as bulbs are manually cut to the required length by means of rotary a saw. The cutting speed is slow and a lot of labor is wasted. The instant invention relates to an automatic cutter to take the place of a manual cutter. Since the invention has sets of cutters to cut both ends of glass tubes simultaneously, the production is larger per unit time and the quality is uniform. Therefore, man power is saved. It is indeed a new and useful invention.

SUMMARY OF THE INVENTION

The invention relates to cutting glass tubes to a preset length one by one where the length to be cut is adjustable by adjustment of the position of the cutter.

The invention utilizes a specialized conveyor system which conveys glass tubes one by one in a wave-like transversal direction. There are sets of cutters along both laterals of the conveyor. Each set of cutters comprises two knives in opposed position and the cutter sets are arranged in different widths so that the glass tubes passing the system are cut at their both ends to the required length by a first set of cutters which has the widest distance, and then the second set of cutters which is arranged with a width smaller than the first set, and so on. At the last set of cutters, each glass tube is cut into three sections.

DESCRIPTION OF THE PREFERRED EMBODIMENT

Figure 1:
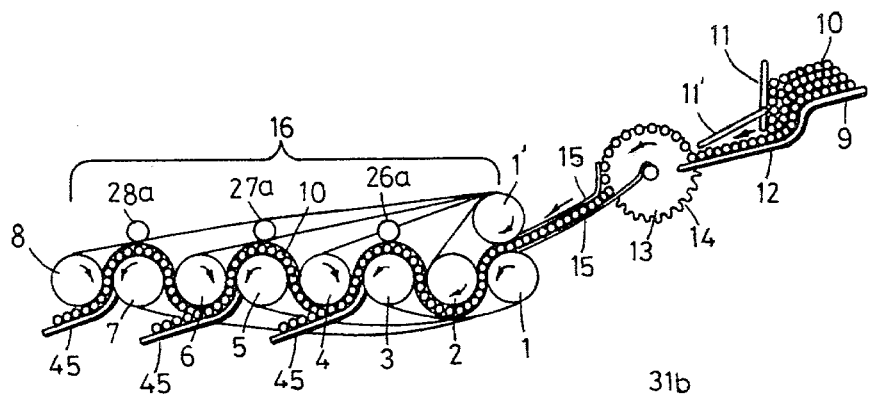
FIG. 1 A flow chart for the operation of the invention.

As shown in FIG. 1, pieces of long glass tubes are placed at the feeding table 9, where there is a gate 11 to control the number of glass tubes 10 fed. After passing the gate 11, glass tubes are rolling on a feeding plate 12 and then fall into an opening 14 of loading wheel 13. Beside the loading wheel there is a scraping plate 11' for scraping away excessive glass tubes. By means of a declining narrow path 15 the glass tubes fall into the conveyor 16 one by one closely. One major feature of the invention is the technology applied in the conveyor and the arrangement of the cutter.

FIGS. 1-9 illustrates the detailed structure of the conveyor. FIG. 1 shows the specially wound conveyor; on it glass tubes are moved by the conveyor due to the driving of rollers. The conveyor is not driving the rollers, since the rollers are driven by chains.

Figure 10:
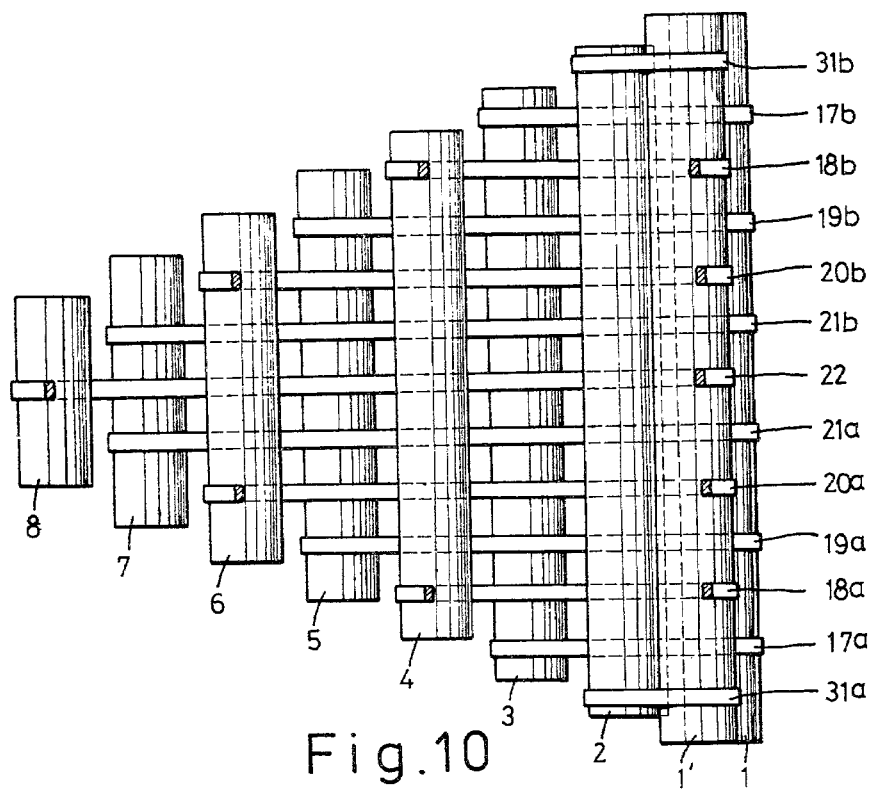
FIG. 10 A top view of the conveyor system illustrating the whole system.

Because of the special winding of the conveyor, it is not easy to illustrate its winding with only FIG. 1. Therefore layer dismantling illustrated in FIGS. 2-9 are presented to give a detailed description and FIGS. 10 and 11 will give an overall understanding on the whole system.

The number of rollers is variable. This embodiment is one with eight rollers. They can be increased or decreased upon actual requirement. Their lengths are decreased gradually and each of them is symmetrical at line A—A. In the rollers 1, 2, 3, . . . 8, four of them, 1, 2, 5 and 7 are rotated in the counterclockwise direction. Therefore, rotations of any two adjacent roller are in opposite directions. The said rollers are driven by a chain transmission, which will be described hereafter.

Figure 2:
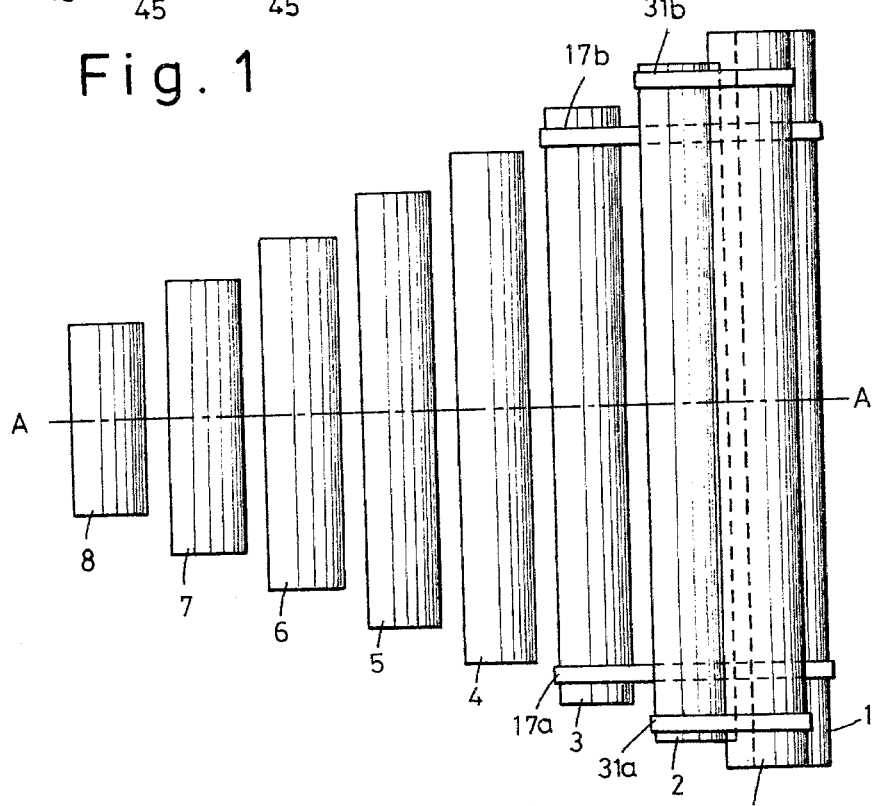
FIG. 2 A top view of the bottom layer of the conveyor system.
Figure 3:
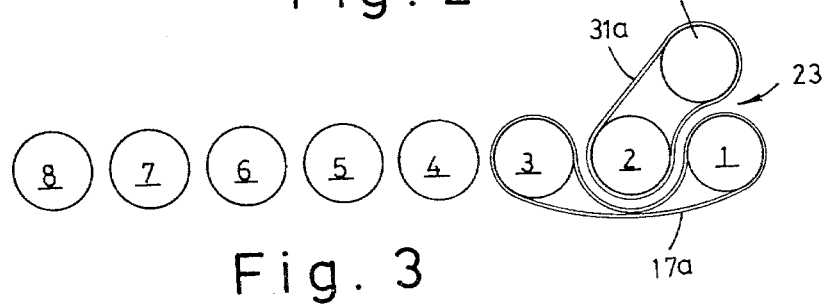
FIG. 3 A front view of FIG. 2.

As shown in the FIG. 2 and FIG. 3, the belts 31a and 31b are wound around the roller 1 and roller 2 at their respective ends. The belts 17a and 17b are wound around both ends of rollers 1, 2 and 3 respectively. The belts 17a and 17b are wound around the roller 1, and then under roller 2 and finally around the roller 3 to form a complete cycle. The belts 31a and 17a form a conveying train.

Figure 4:
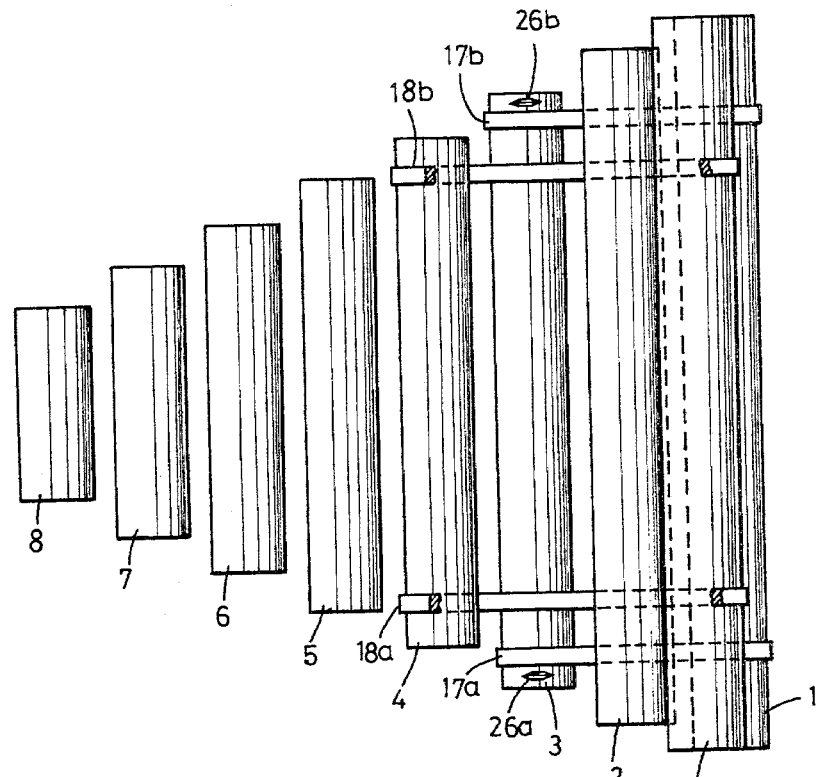
FIG. 4 A top view of the next higher layer of the conveyor system.
Figure 5:
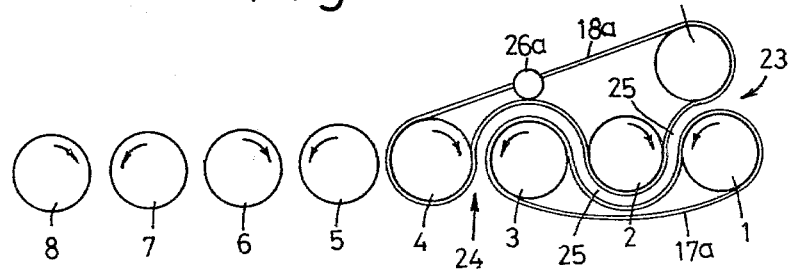
FIG. 5 A front view of FIG. 4.

As shown in FIGS. 4 and 5, the belts 18a and 18b are wound around both ends of the leading roller 1' and the rollers 2, 3, and 4, inside both ends of the belts 17a and 17b. The two belts 18a and 18b are wound over the leading roller 1' and then under roller 2. The belt 18a is located inside the belt 17a. From the FIG. 4, we can see then the belt 17a does not intersect with the belt 18a. The space formed between 17a and 18a as well as 17b and 18b comprises a path for the glass tubes. Similarly, there is a continuous supply of glass tubes feeding the path formed between the belts 17a and 18a. Since the belts are passing the top of some rollers, those rollers are rotating in a counterclockwise direction, and the belts 17a and 18a are moving forward continuously and stably in a wave-like state. The path from the inlet 23 between 1 and 1' to the outlet 24 between 3 and 4 is a wave-like path, a path for feeding glass tubes. Glass tubes are fed from the inlet 23, through a path beneath the roller 2, then lifted to the path above the roller 3. Since there is a set of cutters 26a and 26b installed at both ends of the roller 3 respectively, glass tubes passing the roller 3 are cut at both ends simultaneously. The cut tubes are discharged from the outlet 24 and carried away by means of belt conveyor or conveying channel. In this embodiment, the cutter 26 is for cutting away the waste ends of the glass tubes and the remaining tubes are in an uniform length.

Since between 17a, 18a and 17b, 18b there are other belts arranged symmetrically, the long glass tubes will not be broken while being conveyed.

Figure 6:
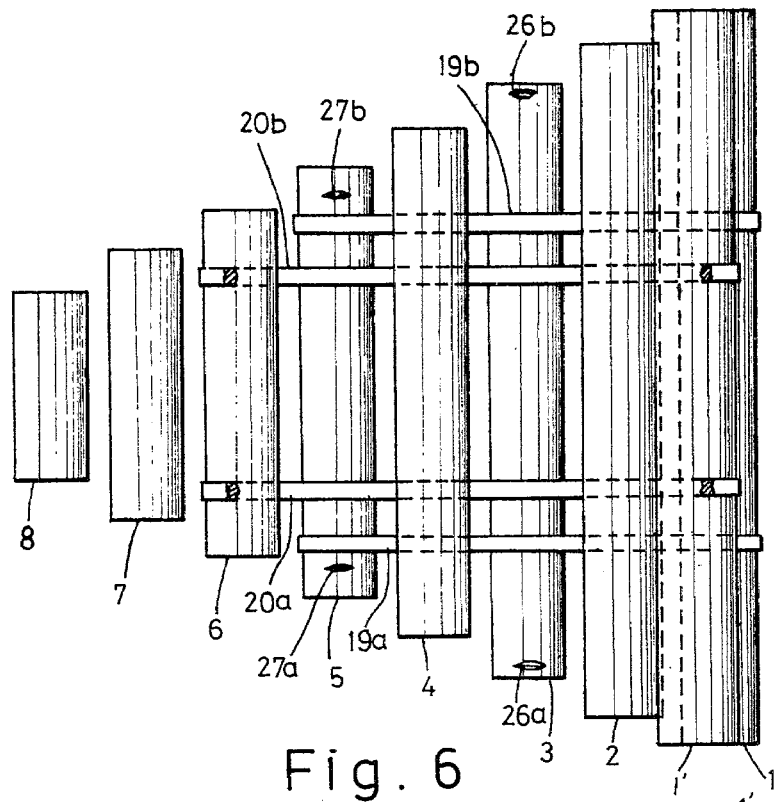
FIG. 6 A top view of the penultimate layer of the conveyor system.
Figure 7:
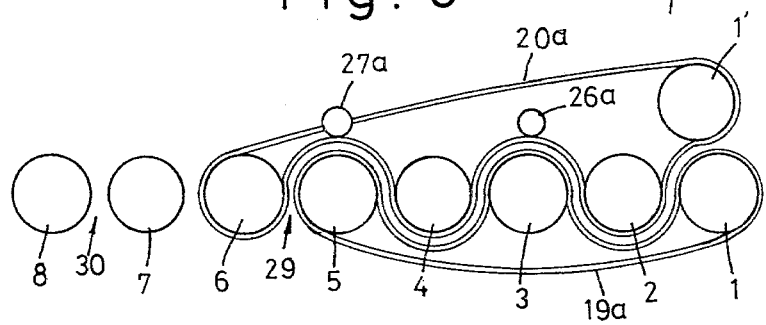
FIG. 7 A front view of FIG. 6.
Figure 8:
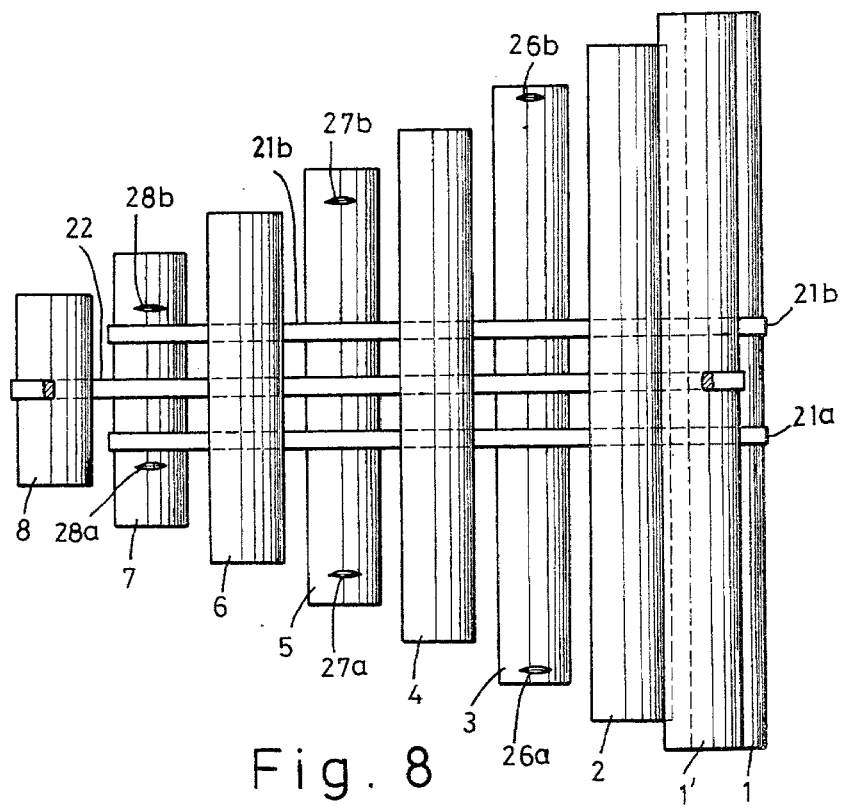
FIG. 8 A top view of the topmost layer of the conveyor system.
Figure 9:
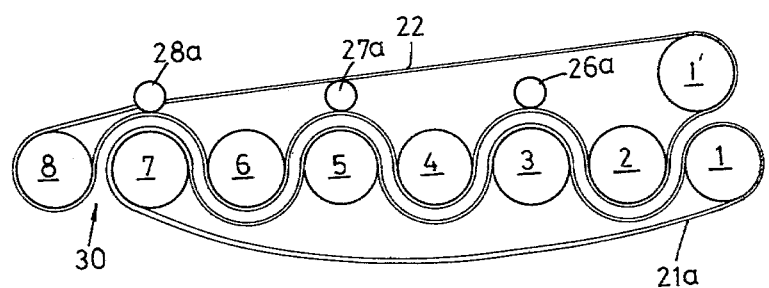
FIG. 9 A front view of FIG. 8.

The FIGS. 6 and 7 illustrate the winding of the belts 19a, 19b and 20a, 20b inside the belts 18a and 18b. Their winding is different from that of 17a and 18a with an additional winding of 19a around the roller 5, passing 5 and then to 1, while 20a passes above the roller 5, around 6 and then to 1'. 19a and 19b are wound at the position inside the belts 18a and 18b and the belts 20a and 20b are wound inside 19a and 19b. Above the roller 5 there is a set of cutter 27a and 27b. When the fed glass tubes are lifted to the roller 5 from 4, they are cut by the cutter 27a and 27b to a preset length. The length is adjustable by adjusting the distance between 27a and 26a (of course, 27b and 26b are symmetrical to 27a and 26a along the line A—A, the length so cut is equal to the distance between 27a and 26b). The cut tubes are discharged from the outlet 29. Similarly, as shown in the FIGS. 8 and 9, the belts 21a, 21b and 22a, 22b are wound around the rollers 7 and 8 respectively. 21a and 21b are at the innerside of 20a and 20b, and 22a and 22b are in the inner side of 21a and 21b. Above the roller 7 there is a set of cutter 28a and 28b to cut the tubes from the cutter 27a and 27b at both ends simultaneously, and then the cut tubes are discharged from the outlet 30.

Figure 11:
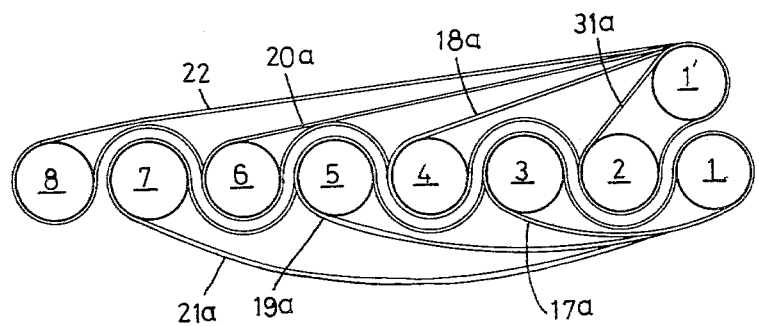
FIG. 11 A front view of the conveyor system illustrating the whole system.

FIG. 11 illustrates the overall arrangement of the conveyor system. From this we can see that glass tubes are passing rollers 1 and under 2, and then cut at both ends at roller 3, 4 . . . one by one. At each roller there are belts symetrically placed to carry the tubes. Therefore, the tubes will not be broken.

Figure 12:
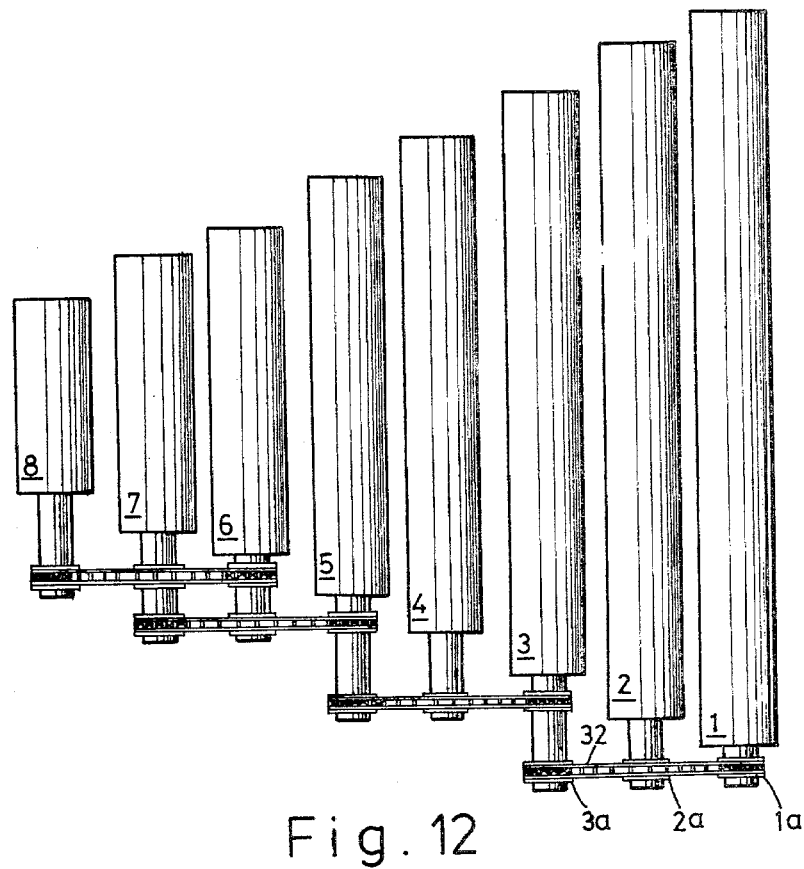
FIG. 12 A top view of the transmission system for the conveyor of the invention.
Figure 13:
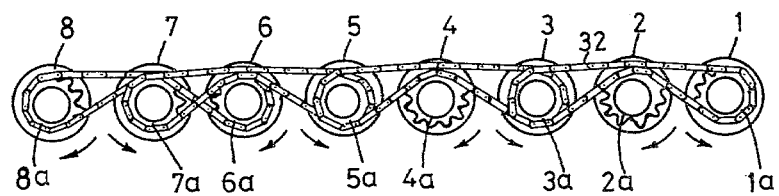
FIG. 13 A front view of the transmission system for the conveyor of the invention.

FIGS. 12 and 13 illustrate the transmission system of the conveyor. There are sprockets 1a, 2a and 3a on the rollers 1, 2 and 3 respectively. Since the transmission is by means of the chain 32, the rollers 1 and 3 are rotating in counterclockwise direction at uniform speed and the roller 2 is rotating clockwise. In order to maintain an uniform pressure to the roller, chains and sprockets at the ends make a synchronous transmission. Furthermore, since the distance between the centers of the shafts is not great, transmission by gearing is possible. Transmission of the rollers 4, 5, 6, 7 and 8 is identical to that of rollers 1, 2, and 3.

Figure 14:
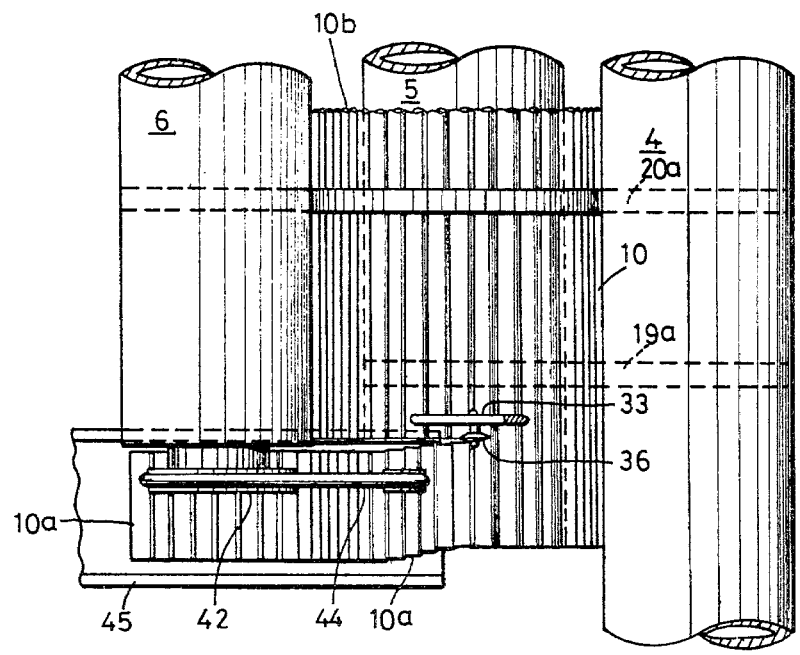
FIG. 14 A top view of the cutter for the invention.
Figure 15:
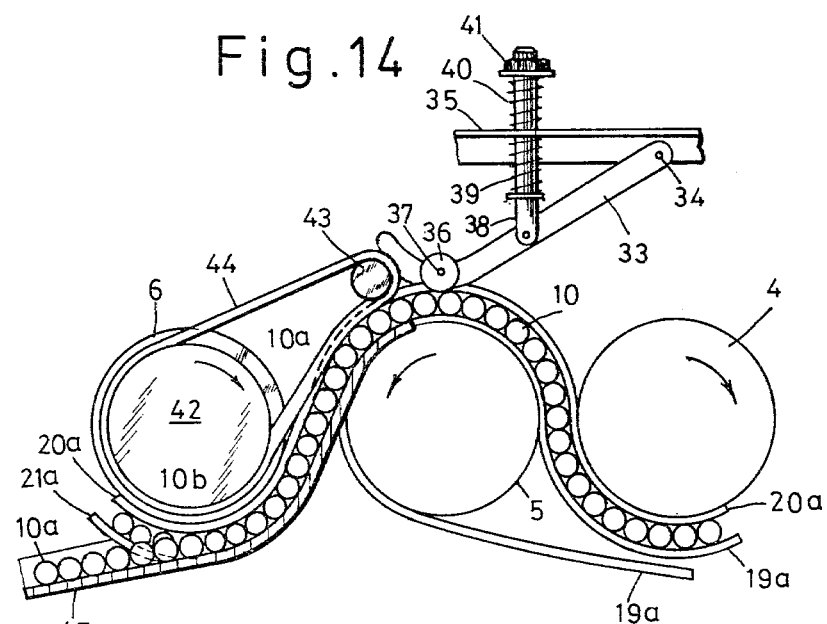
FIG. 15 A front view of the cutter for the invention.

FIGS. 14 and 15 show the structure of the cutter and breaking device respectively. The abovementioned cutters 26a, 26b, 27a, 27b, 28a and 28b are installed on both ends of the rollers 3, 5 and 7 respectively. All cutters are identical both in structure and function. Cutter 27a is used as an example in the description herein. As shown in the FIG. 15, there is a directing rod 33 above the roller 5. Its right end is hinged at the frame 35 by means of a pin 34 and it can swing upward and downward freely with the pin 34 as a pivot. Its left end is in an arch shape, the knife wheel 36 is installed beside it by means of a pin 37 and works as a cutter directly. At the middle of the directing rod 33 there is a pressure regulating rod 38. The pressure regulating rod 38 passes through the frame 35 and has spring 39 and 40 installed at both ends respectively for regulating the pressure applied to the glass tubes. Adjustment is done by turning a nut 41. At the shaft of the roller 6 there is a belt pulley 42 and at the left side of the regulating rod 38 there is a small pulley 43, which is hinged at the frame and rotatable freely. The breaking belt 44 is wound around the pulley 43 and pulley 42. It is driven by the pulley 42 and it applies a pressure to the tubes which have just been cut by 36 so that the tubes are broken and fall into the collection path 45, as shown in the FIG. 15. The cut tubes are then moved forward by the belts 20a and 21a for further cutting.

Since glass tubes will be broken easily once there is a load applied to them, the section of breaking is uniform. Since the glass tubes to be cut by the invention are mainly used in making bulbs, it is not essential that the section of breaking be uniform but that their length should be uniform.

In conclusion, ordinary conveyor systems are not able to carry glass tubes satisfactorily and therefore, cutting them on an ordinary conveyor is impossible. The invention has overcome the problem.

The characteristics of the invention are as follows:

(1) On efficiency: by means of traditional cutting equipment, a laborer, who works 8 hours per day, can cut about 10 boxes of glass tubes. By means of the invention, with 2 laborers, one at each side of the invention for picking waste material, the production capacity is 160 boxes per day and on the average, each laborer has a capacity of cutting 80 boxes per day. Therefore, the production efficiency is 8 times that of traditional ones and in overall production capacity, it is 16 times that of traditional one.

(2) Operation is safer than that of a traditional one. In a traditional operation, tubes have to be taken by hands and moved to the saw blade. The operator has to pay full attention to the operation. Otherwise, he will be injured. The invention is of mechanical operation. It is impossible to injure an operator.

(3) Glass tubes are moved forward in a wave-like form safely and efficiently.

(4) Quality of the product is uniform, control of quality is easy.

(5) On the power consumption in unit production, less power is required than an ordinary operation. It is an economic benefit in the time of an energy crisis.

What is claimed is:

1. A device for cutting long rod, or tubular products, particularly glass tubes comprising:
   a feeding device, including,
   a gate at an outlet of a feeding table for controlling the outlet quantity of tubes from said feeding table;
   a feeding plate which has a slope to guide the material from said feeding table;
   a loading wheel which has a plurality of openings around its periphery; by means of its rotation, tubes falling into said openings are sent to a narrow path;
   a scraping plate to scrape away the tubes on said loading wheel and
   a narrow path between said loading wheel and an inlet of a conveyor system which allows passing of only a piece of tube so that the feeding is in a row of tubes falling into said conveyor system one by one;
   a conveyor system which causes a wave-like transversal conveying of the tubes, and has a width which becomes smaller and smaller gradually following a sequence of cuttings;
   a plurality of cutter pairs, each pair of which are installed at two sides of said conveyor system and the distance between said pair of cutters is adjusted upon the length of material to be finished; and
   a collection path, installed in front of each said cutter for collecting said cut tubes and then conveyed to a certain place for packing or processing.

2. The device of claim 1 wherein said conveyor system includes a plurality of rollers in parallel arrangement whose lengths change in a convergent series, any two consecutive said rollers are rotating in a direction opposite to each other, the centers of the central line of all said rollers are in a same line and the line is perpendicular to the central line of any said roller;
   a plurality of endless belts of different lengths, the longest one said belt wound from a longest said roller to an other either above it or beneath it in a wave-like arrangement till a shortest said roller and then wound back to said longest roller; a second said belt which is just shorter than said longest one wound from said longest roller in a path identical to said longest belt to said roller which is just shorter than said longest roller and then wound back to the starting point, and so on, and said shortest belt wound from said longest roller to a directing roller above said longest roller for holding the tubes from the narrow path.

3. The device of claim 2 wherein said belts are moved forward slowly by means of rotation of said rollers and there is a wave-like path between any two said consecutive belts for transferring the tube forward.

4. The device of claim 3 wherein said cutters are installed beside said rollers which are in an odd number arrangement and each said cutter includes a directing rod, which is fixed to a frame at one end and movable freely at an other end, and a knife wheel for cutting the tubes, and there is a spring between said rod and said frame for adjusting the pressure between said knife wheel and the tube and, a belt driven by a big pulley and a small pulley for breaking the tube which has just been cut.

* * * * *